July 7, 1953   H. H. HEMPE   2,644,493
ADJUSTABLE MITER BOX
Filed Aug. 14, 1948
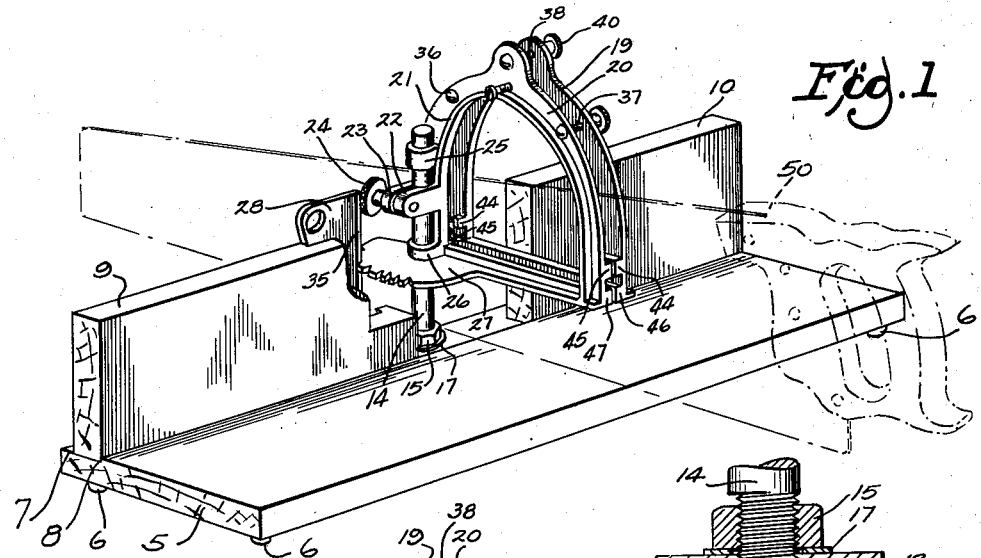
Fig. 1
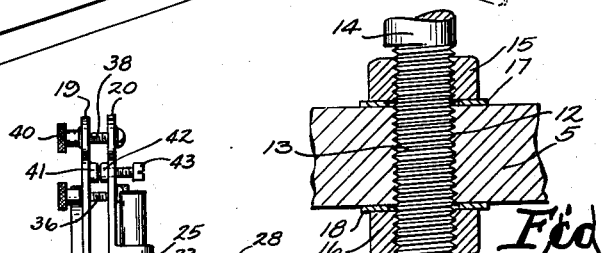
Fig. 3   Fig. 2
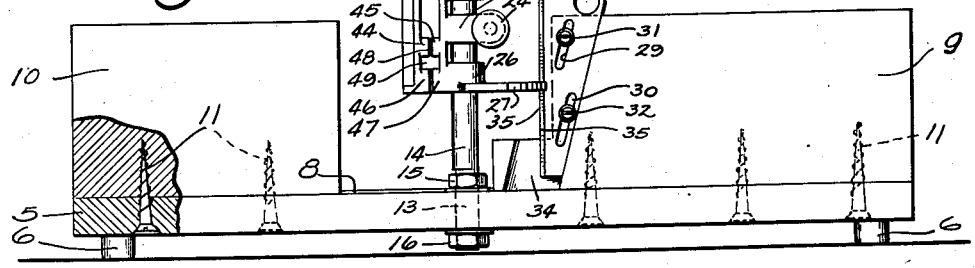
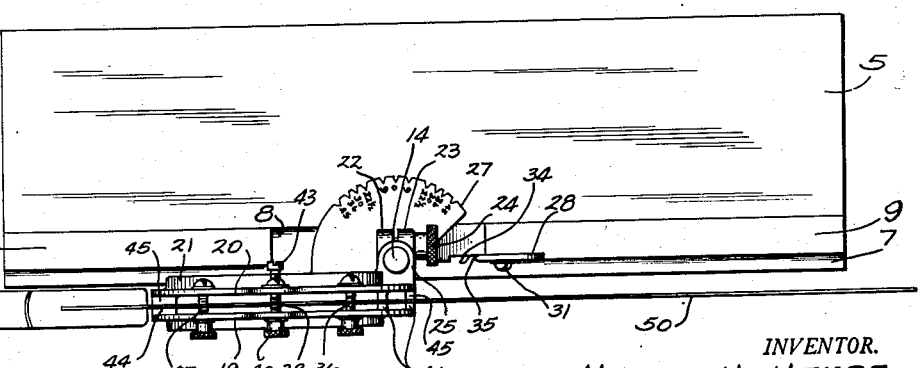
Fig. 4
INVENTOR.
HAROLD H. HEMPE
BY
Wheeler, Wheeler & Wheeler
ATTORNEYS Patented July 7, 1953

2,644,493

UNITED STATES PATENT OFFICE 2,644,493

ADJUSTABLE MITER BOX

Harold H. Hempe, Wauwatosa, Wis.

Application August 14, 1948, Serial No. 44,289

5 Claims. (Cl. 143—89)

This invention relates to a miter box which is not merely adjustable to position the saw at various angles for use, but is also adjustable for purposes of calibration and is adjustable to a position where the saw is carried behind the miter box for transportation.

It is a further object of the invention to provide miter box hardware which can be applied to a wooden miter box with a minimum of expense and to provide accurate adjustment for the purposes stated.

It is a further object of the invention to provide a novel miter box construction adapted to employ either a back saw or a conventional saw and readily adjustable to clamp the saw for transportation and to release it for use.

Still other objects will be developed more fully in connection with the following disclosure of the invention.

In the drawings:

Fig. 1 is a view in perspective showing a miter box embodying my invention, portions of the back being broken away.

Fig. 2 is a fragmentary detail view on an enlarged scale in section through a portion of the base and the mounting post for the saw guide.

Fig. 3 is a view in rear elevation of the miter box shown in Fig. 1, portions of the back being broken away.

Fig. 4 is a plan view of the miter box shown in Fig. 1.

My improved miter box comprises a base at 5 which may be provided with rubber feet at 6 if desired. Along its back edge the base is slightly reduced in thickness to provide a gluing surface at 7 and a shoulder at 8. The back comprises two parts 9 and 10 which are attached on the surface 7 and against the shoulder 8. Preferably the base and the component parts of the back are held in a jig while the glue connecting them sets. While so held, they are further secured together by long screws such as those shown at 11, the screws and the glue cooperating to make a tight and thoroughly rigid joint.

Between the parts 9 and 10 of the back, the portion 7 of the base is provided with a screwthreaded opening 12 into which the screwthreaded lower extremity 13 of the mounting post 14 is screwed. As best appears in Figs. 2 and 3, the screwthreaded portion 13 of post 14 is off center with respect to the post, whereby the post is eccentrically movable on an orbit of slight radius as the screwthreaded shank 13 is rotated in the base 5 of the miter box. The purpose of this is to provide a calibrating adjustment for the saw guide, as will hereinafter be described. Lock nuts 15 and 16 are provided on the screwthreaded shank 13 above and below the base and these are clamped tightly upon the base through the intervening washers 17, 18, to hold the post 14 in any selected adjustment.

The saw guide comprises two separately fabricated parts 19 and 20, each of which is stirrup-shaped as clearly shown in Fig. 1. The part 20 is provided with a reenforcing flange 21 which is integral with a clamping ear at 22. A cooperating ear 23 projects from the side of the guide member 20 and the two ears are correspondingly channeled to provide a split bearing for clampingly engaging the post 14. The hand screw 24 passes through ear 23 and is threaded to ear 22. This screw is used to tighten and release clamping engagement of the ears 22, 23 upon the post. Other bearings at 25 and 26 project integrally from the guide member 20 to engage the post, these last mentioned bearings being free for rotative and axial movement respecting the post.

A segment 27 projects horizontally from the guide element 20, being integral with such element and with its bearing collar 26. As best shown in Figs. 1 and 4, the periphery of segment 27 is notched at points which are suitably marked in degrees to indicate the rotative angle to which the saw guide is adjusted respecting a line drawn across the base at right angles to the back of the miter box. The back element 9 of the miter box is provided with a latch plate 28 slotted at 29, 30 to be guided for oblique movement upon the guide bolts 31, 32, which project from the rear side of the miter box back element 9. Said element may desirably be provided with an obliquely inclined kerf or channel 34 in which the plate 28 reciprocates. The sharpened or beveled margin 35 of the plate is desirably upright, or approximately so, and, when the miter box is in use, it is normally engaged in an appropriate notch on the periphery of the segment 27. If the saw guide is adjusted to a position at right angles to the front faces of the back elements 9 and 10, the sharpened edge 35 of latch plate 28 will be engaged with the central notch marked zero. By lifting the plate 28, whereby its oblique movement will withdraw its sharpened edge from the notch, the segment will be freed to permit the saw guide assembly to be rotated on the post 14 (the clamp screw 24 being first released) to a new position of adjustment, whereupon the latch plate 28 may be dropped into engagement with the notch which indicates the plus or minus angle of the desired adjustment from the normal position. If desired, the clamp 24 may be so adjusted that it merely provides suitable friction on the post, without being rigidly clamped thereto.

For holding a saw to the guide element 20 thus supported from the post, I provide the second guide element 19 with a plurality of separate screws connecting it to guide element 20. Near the top of the saw guides 19 and 20, such guides are provided with several holes for bolts 36, 37 and 38, the latter being at the top. Each of these bolts is provided with a manually operable nut, the nut of bolt 38 being designated by reference character 40. On a level slightly higher than that of bolts 36 and 37, but lower than the level of bolt 38, the respective guides 19 and 20 are provided on their inner faces with bosses 41, 42, one of which is tapped to receive a set screw 43 which bears against the other boss to limit the approach of the guide elements 19 and 20 at this point.

Near their lower margins, the saw guides 19 and 20 are provided with upper bosses 44, 45 (Figs. 3 and 4) and lower bosses 46, 47. Between the upper bosses and lower bosses is a blade-receiving slot 48 and a communicating channel at 49.

With the nuts of bolts 36, 37 so adjusted that there is just sufficient free clearance between bosses 44, 45 and bosses 46, 47 for the free sawing movement of a saw blade mounted in the guides, the set screw 43 is adjusted until the said bosses clampingly engage the saw blade. During this adjustment the nut 40 on the top bolt 38 will be free. Once this adjustment is effected, the mere manipulation of the single nut 40 will either spring the guide element 19 to separate the bosses to permit the blade of the saw to move freely, or, if the nut is unscrewed, it will permit the resilience of the guide element 19 to clampingly engage the blade to support it for transportation. The engagement and release of the blade is effected in the same manner whether a back saw or a conventional carpenter's saw is mounted between the guides. A carpenter's saw 50 is shown therein in dotted lines in Fig. 1 and in full lines in Fig. 4.

The latch plate 28, when thrust downwardly into engagement with one of the notches of segment 27, acts with a wedging action between its guide bolts 31, 32, and the opposing segment. This holds the said guides 19 and 20 very rigidly in the selected position of adjustment. No outbearing support for the guide assembly is required and the entire miter box is therefore entirely open for the insertion and removal of work to be cut. When the plate 28 is lifted to free the guides for oscillation upon the post 14, the adjustment is very speedily effected and the plate is readily reengaged with a new notch in the segment 27 if desired. However, if it be desired to fold the apparatus for transportation, the height of post 14 is such that before the bearing ear 25 clears the top thereof, the segment 27 will clear the top of the miter box back element 10, whereby the entire guide assembly may be swung from the operative position of Fig. 1 to the inoperative position of Fig. 4 and may there be lowered with the saw 50 directly behind the back elements 9 and 10 of the miter box, the saw being preferably already clamped between said guides 19 and 20 by the release of the manually operable nut 40 on bolt 38. To restore the saw and guides to position for use, it is only necessary to lift them, swing the saw and guides over the back element 10, and lower them to the work in approximately the position shown in Figs. 1 and 3, engaging the latch plate 28 in the selected notch of the segment, and tightening the nut 40 sufficiently to spring guide element 19 and thereby to release the blade from clamping engagement of bosses 44 and 46 against the opposing bosses 45 and 47. The apparatus is then in condition for use.

For initial or any subsequent calibration, the nuts 15 or 16, or one of them, is loosened while the segment 27 is anchored by the latch plate 28. The post 14 is then rotated eccentrically by screwing or unscrewing its threaded shank portion 13 in base 5. This will cause the portion of the guide remote from the post to oscillate through a space up to one-fourth of an inch. When the angle between the saw and the back elements 9 and 10 is accurate in accordance with the calibration in which the latch plate is engaged at the time, the nuts 15 and 16 are tightened to maintain the calibrated adjustment and thereafter adjustment is made simply by lifting the latch plate and oscillating the guide members upon the post. No further calibration is necessary unless calibration is destroyed, in which case the device may be recalibrated as above described.

The apparatus herein disclosed is an improvement upon the device of the expired patent to Converse, No. 716,384, dated December 23, 1902, the particular improvement being pointed out in the accompanying claims.

I claim:

1. In a miter box, the combination with a saw guide, of an upright post upon which said guide is oscillatable, and means on the box for latching the guide in selected angles of adjustment, the post having an off center base of circular contour and a mounting comprising a bearing in which the base is rotatable for eccentrically adjusting the post in said mounting for calibrating the saw guide to said latching means, together with means for clamping the post in calibrated position.

2. In a miter box, the combination with a saw guide, of an upright post upon which said guide is oscillatable, and means for latching the guide in selected angles of adjustment, the post having an eccentric mounting adjustable for calibration, said box being provided with a bearing and said post being provided with an eccentric shank in said bearing, and clamping means adjustable upon the shank and engageable axially thereof with the bearing.

3. In a miter box, the combination with a saw guide, of an upright post upon which said guide is oscillatable, and means for latching the guide in selected angles of adjustment, the post having an eccentric mounting adjustable for calibration, said box being provided with a tapped bearing and said post being provided with an eccentric shank threaded in said bearing, and clamping means adjustable upon the threads and engageable with the bearing.

4. A miter box comprising a back and a base, a guide post having an eccentric shank in threaded connection with the base and upon which the post may be oscillated for calibration purposes, a lock nut threaded to the shank and in clamping engagement with the base for maintaining post calibration, and a saw guide oscillatable upon the post and provided with a projecting segment, the miter box having a latch plate selectively engageable with the segment for determining the angular position of the saw guide, subject to calibration by the rotation of said post respecting the base.

5. The combination set forth in claim 4 in which said saw guide comprises a pair of guide elements, one of which is provided integrally with a bearing on said post and the other is provided with means for adjustably supporting it for movement to and from the element having a post bearing.

HAROLD H. HEMPE.

References Cited in the file of this patent

UNITED STATES PATENTS

| Number | Name | Date |
|---|---|---|
| 409,455 | Cowell | Aug. 20, 1889 |
| 665,693 | Page | Jan. 8, 1901 |
| 716,522 | Converse | Dec. 23, 1902 |
| 766,796 | Richards | Aug. 2, 1904 |
| 766,799 | Richards | Aug. 2, 1904 |
| 834,073 | Parsons | Oct. 23, 1906 |
| 1,738,200 | Pealer | Dec. 3, 1929 |

OTHER REFERENCES

"Motor Automotive Repair Manual," Studebaker Auxiliary Steering Arm 1947–1949 Champion TL 152.